No. 12,239. REISSUED JULY 19, 1904.

T. A. DOUGHTY.

HEATING STOVE.

APPLICATION FILED JUNE 10, 1904.

Witnesses:
Chas. O. Shervey
Russell Mills

Inventor:
Theodore A. Doughty
by H. P. Bitner, His Atty.

No. 12,239. Reissued July 19, 1904.

UNITED STATES PATENT OFFICE.

THEODORE A. DOUGHTY, OF ELKHORN, WISCONSIN.

HEATING-STOVE.

SPECIFICATION forming part of Reissued Letters Patent No. 12,239, dated July 19, 1904.

Original No. 760,386, dated May 17, 1904. Application for reissue filed June 10, 1904. Serial No. 212,001.

*To all whom it may concern:*

Be it known that I, THEODORE A. DOUGHTY, a citizen of the United States of America, residing at Elkhorn, in the county of Walworth and State of Wisconsin, have invented certain new and useful Improvements in Heating-Stoves, of which the following is a specification.

My invention relates to certain new and useful improvements in heating-stoves; and its object is to produce a fire-pot which shall protect the casing of the stove in which it is used from the deleterious influence of the fire and still permit free radiation of heat through the casing.

To this and certain minor ends my invention consists in certain novel features of construction, which are illustrated in the accompanying drawings and described in the specification.

Figure 1:
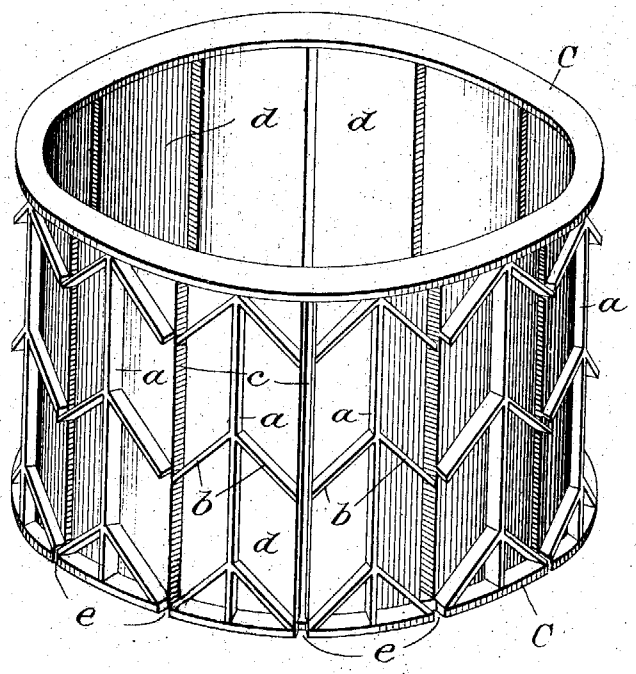
Figure 2:
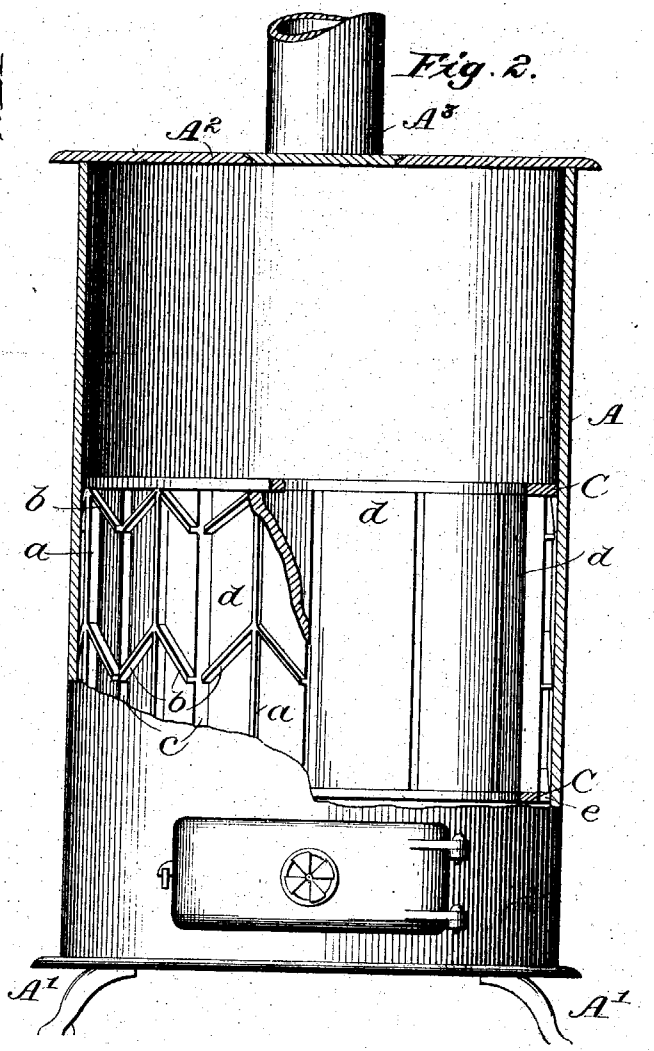

In the aforesaid drawings, Figure 1 is a perspective of my improved fire-pot; and Fig. 2 is a front view of the stove, a portion of the wall of the stove being broken away in a central vertical plane and a portion of the fire-pot being broken away to show the construction and relations of the parts.

Referring to the drawings, A is the wall of a stove, which may be of any form, but which is here indicated as being cylindrical.

The stove is supported upon a suitable base or legs A′ and is provided with a top $A^2$ and a stovepipe $A^3$, opening into the top.

The particular construction of the stove is entirely immaterial, and it is to be understood that it can be varied as desired.

Within the lower portion of the stove is shown my improved fire-pot, the construction of which is best seen in Fig. 1. Two horizontal annular ribs C form the top and bottom of this device, and between these ribs run a plurality of vertical sections *d*, between which sections are vertical slots *c*. Upon the back of each of the sections *d* is a vertical rib *a*, which projects outward from the section a distance equal to the amount which the ribs C project outward therefrom, and from these central ribs *a* to the slot *c* extend downwardly-inclined diagonal ribs *b* of equal width with the ribs *a*. When in place in the stove, the ribs C C lie in contact with the inner face thereof, as do the ribs *a b*. By this arrangement it will be seen a space is provided outside the fire-pot and between it and the wall of the stove.

It is to be understood that while I have shown and described the fire-pot as being cast in one piece and while this is the preferred form of construction, still the same structure can be made of a number of separate sections secured together by bolts, screws, or in any other obvious way.

The operation of this device will now be explained. The fire is built inside the fire-pot in the ordinary way, any combustible substance being used for fuel, and the burning vapor passes up through the center of the stove and strikes the fire-pot. A certain amount of heat is of course conducted through the sections *d* and heats the gas between the fire-pot and the wall of the stove, which in turn heats the wall of the stove, and so the room. A much greater amount of heat, however, passes directly through the slots *c* and heats the wall of the stove directly; but no great body of flame can pass through these slots, and consequently the wall of the stove is entirely protected from the oxidizing action of the flame. In spite of this fact, however, a very large proportion of the heat is radiated.

The diagonal ribs *b* catch any ashes which may work from inside the fire-pot either over the top or through the slots *c* and cause them to fall away from the central portion of the sections *d* and toward the slots *c*. Apertures *e* are provided at the bottom of the slots *c* in the lower flange C, through which the ashes may fall into the ash-pit at the bottom of the stove. In this way the space between the lining and the wall of the stove is prevented from filling up. These apertures *e* have a further advantage in that fresh air rises from the space below the fire-pot through them, passes through the slots in the sides of the fire-pot, and reaches the entire body of burning fuel.

I realize that considerable variations are possible in the details of this construction without departing from the spirit of the invention, and I therefore do not intend to limit myself to the specific form herein shown and described except as pointed out in the claims.

I claim as new and desire to secure by Letters Patent—

1. The combination with the wall of a stove, of a lining therein and substantially parallel thereto, composed of a plurality of sections separated by vertical slots, each of said sections having upon its outer side diagonally-disposed ribs adapted to deflect foreign material into the line of the slots.

2. The combination with the wall of a stove, of a plurality of lining-sections secured together by suitable flanges at the top and bottom, said sections being separated by vertical slots, and each of said sections having upon its back a vertical rib and oppositely-inclined diagonally-disposed ribs running from said central rib downward toward said slots, whereby foreign material is deflected to the line of said slots.

3. The combination with the wall of a stove, of a plurality of lining-sections secured together by suitable flanges at the top and bottom, said sections being separated by vertical slots, and each of said sections having upon its back a vertical rib and oppositely-inclined diagonally-disposed ribs running from said central rib downward toward said slots, whereby foreign material is deflected to the line of said slots, the lower flange being cut away to permit such material to fall into the ash-pit.

4. The combination with the wall of a stove, of a lining therein having a suitable flange at the bottom, said flange being cut away at intervals, the lining having a plurality of perforations opening into the space between the lining and the wall of the stove and having upon its outer side a series of diagonally-disposed ribs adapted to guide foreign material into the spaces in the lower flange.

THEO. A. DOUGHTY.

Witnesses:
WM. QUINN,
W. J. TUBBS.